(12) United States Patent
Confalonieri et al.

(10) Patent No.: US 11,687,273 B2
(45) Date of Patent: Jun. 27, 2023

(54) MEMORY CONTROLLER FOR MANAGING DATA AND ERROR INFORMATION

(71) Applicant: Micron Technology, Inc., Boise, ID (US)

(72) Inventors: Emanuele Confalonieri, Segrate (IT); Paolo Amato, Treviglio (IT); Marco Sforzin, Cernusco Sul Naviglio (IT); Danilo Caraccio, Milan (IT); Daniele Balluchi, Cernusco Sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/489,336

(22) Filed: Sep. 29, 2021

(65) Prior Publication Data
US 2023/0096375 A1 Mar. 30, 2023

(51) Int. Cl.
*G06F 3/06* (2006.01)
(52) U.S. Cl.
CPC .......... *G06F 3/0655* (2013.01); *G06F 3/0619* (2013.01); *G06F 3/0679* (2013.01)
(58) Field of Classification Search
CPC ..... G06F 3/0655; G06F 3/0679; G06F 3/0619
See application file for complete search history.

(56) References Cited

U.S. PATENT DOCUMENTS

| | | | |
|---|---|---|---|
| 8,468,417 B2 | 6/2013 | Asnaashari et al. | |
| 8,799,681 B1* | 8/2014 | Linnell | G06F 21/64 713/193 |
| 10,949,361 B1* | 3/2021 | Isakovich | G06F 11/1004 |
| 11,170,869 B1* | 11/2021 | Helmick | H03M 13/1145 |
| 2016/0378580 A1* | 12/2016 | Ries | G06F 11/0751 714/819 |
| 2019/0189157 A1* | 6/2019 | Cideciyan | H03M 13/2792 |
| 2020/0273841 A1* | 8/2020 | Helmick | G11C 29/74 |
| 2021/0042189 A1* | 2/2021 | Whately | G06F 13/1689 |
| 2021/0286752 A1 | 9/2021 | Modukuri et al. | |

* cited by examiner

*Primary Examiner* — Mark A Giardino, Jr.
(74) *Attorney, Agent, or Firm* — Brooks, Cameron & Huebsch, PLLC (57) ABSTRACT

A memory controller can include a front end portion configured to interface with a host, a central controller portion configured to manage data, a back end portion configured to interface with memory devices. The memory controller can manage memory devices according to different protocols. For a first protocol, the memory device performs error correction operations and for a second protocol, the memory controller performs error correction operations. For the first protocol, error correction information, error detection information, and/or metadata is exchanged between the memory devices and the memory controller via data pins. For the second protocol, error correction information, error detection information, and/or metadata is exchanged between the memory devices and the memory controller via data mask inversion pins. The second protocol can have some features disabled that are enabled according to the first protocol, such as low-power features.

34 Claims, 7 Drawing Sheets

MEMORY CONTROLLER FOR MANAGING DATA AND ERROR INFORMATION

TECHNICAL FIELD

The present disclosure relates generally to semiconductor memory and methods, and more particularly, to apparatuses, systems, and methods for a memory controller for managing data and error information.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Systems, apparatuses, and methods related to a memory controller for managing data and error information are described. The memory controller can include a front end portion configured to interface with a host, a central controller portion configured to manage data, a back end portion configured to interface with memory devices, and a management unit. The memory controller can manage memory devices according to different protocols.

For example, a first protocol can be such that the memory device performs error correction operations on data and a second protocol can be such that the memory controller performs error correction operation on data. The memory controller can disable any error correction circuitry, of the central controller portion, coupled to the memory devices operated according to the first protocol.

The first protocol can be such that error correction information, error detection information, and/or metadata is exchanged between the memory devices and the memory controller via data pins (e.g., not contemporaneously with the exchange of data via the data pins). The second protocol can be such that error correction information, error detection information, and/or metadata is exchanged between the memory devices and the memory controller via data mask inversion pins (e.g., contemporaneously with the exchange of data via the data pins).

In some embodiments, memory devices operated according to the first protocol can include a greater quantity of banks than memory devices operated according to the second protocol. The memory devices operated according to the second protocol are physically smaller than memory devices operated according to the first protocol, while both memory devices can have a same total memory capacity.

Memory devices operated according to the second protocol can have some features disabled that are enabled according to the first protocol. The features can be low-power features. By way of example, the memory devices can be DRAM such as memory operated according to one or more protocols (e.g., low-power double data rate (LPDDRx)).

In some embodiments, the memory system can be a compute express link (CXL) compliant memory system. The host interface can be managed with CXL protocols and be coupled to the host via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transmitted, received, or exchanged by electronic signals (e.g., current, voltage, etc.)

and that the phrase "signal indicative of [data]" represents the data itself being transmitted, received, or exchanged in a physical medium.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Analogous elements within a Figure may be referenced with a hyphen and extra numeral or letter. See, for example, elements 102-1, 102-2, 102-M in FIG. 1. Such analogous elements may be generally referenced without the hyphen and extra numeral or letter. For example, elements 102-1, 102-2, 102-M may be collectively referenced as 102. As used herein, the designators "M" and "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
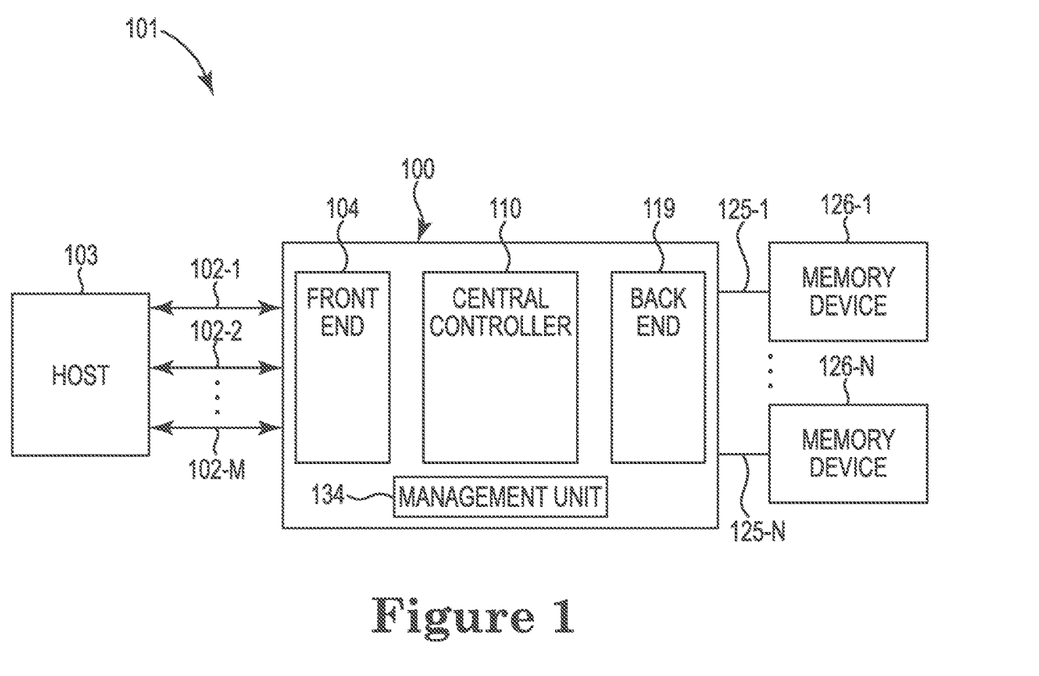
FIG. 1 is a functional block diagram of a computing system including a memory controller in accordance with a number of embodiments of the present disclosure.

FIG. 1 is a functional block diagram of a computing system 101 including a memory controller 100 in accordance with a number of embodiments of the present disclosure. The memory controller 100 can include a front end portion 104, a central controller portion 110, and a back end portion 119. The computing system 101 can include a host 103 and memory devices 126-1, . . . ,126-N coupled to the memory controller 100.

The front end portion 104 includes an interface and interface management circuitry to couple the memory controller 100 to the host 103 through input/output (I/O) lanes 102-1, 102-2, . . . , 102-M and circuitry to manage the I/O lanes 102. There can be any quantity of I/O lanes 102, such as eight, sixteen, or another quantity of I/O lanes 102. In some embodiments, the I/O lanes 102 can be configured as a single port. In at least one embodiment, the interface between the memory controller 100 and the host 103 can be a PCIe physical and electrical interface operated according to a CXL protocol.

The central controller portion 110 can include and/or be referred to as data management circuitry. The central controller portion 110 can control, in response to receiving a request from the host 103, performance of a memory operation. Examples of the memory operation include a read operation to read data from a memory device 126 or a write operation to write data to a memory device 126.

The central controller portion 110 can generate error detection information and/or error correction information based on data received from the host 103. The central controller portion 110 can perform error detection operations and/or error correction operations on data received from the host 103 or from the memory devices 126. An example of an error detection operation is a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data. An example of an error correction operation is an error correction code (ECC) operation. ECC encoding refers to encoding data by adding redundant bits to the data. ECC decoding refers to examining the ECC encoded data to check for any errors in the data. In general, the ECC can not only detect the error but also can correct a subset of the errors it is able to detect.

The back end portion 119 can include a media controller and a physical (PHY) layer that couples the memory controller 100 to the memory devices 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 125-1, . . . , 125-N. The channels 125 can include a sixteen pin data bus and a two pin data mask inversion (DMI) bus, among other possible buses. The back end portion 119 can exchange (e.g., transmit or receive) data with the memory devices 126 via the data pins and exchange error detection information and/or error correction information with the memory devices 126 via the DMI pins. The error detection information and/or error correction information can be exchanged contemporaneously with the exchange of data.

An example of the memory devices 126 is dynamic random access memory (DRAM) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). In at least one embodiment, at least one of the memory devices 126-1 is operated as an LPDDRx DRAM device with low-power features enabled and at least one of the memory devices 126-N is operated an LPDDRx DRAM device with at least one low-power feature disabled. In some embodiments, although the memory devices 126 are LPDDRx memory devices, the memory devices 126 do not include circuitry configured to provide low-power functionality for the memory devices 126 such as a dynamic voltage frequency scaling core (DVFSC), a sub-threshold current reduce circuit (SCRC), or other low-power functionality providing circuitry. Providing the LPDDRx memory devices 126 without such circuitry can advantageously reduce the cost, size, and/or complexity of the LPDDRx memory devices 126. By way of example, an LPDDRx memory device 126 with reduced low-power functionality providing circuitry can be used for applications other than mobile applications (e.g., if the memory is not intended to be used in a mobile application, some or all low-power functionality may be sacrificed for a reduction in the cost of producing the memory).

In some embodiments, the memory controller 100 can include a management unit 134 to initialize, configure, and/or monitor characteristics of the memory controller 100. The management unit 134 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

Figure 2:
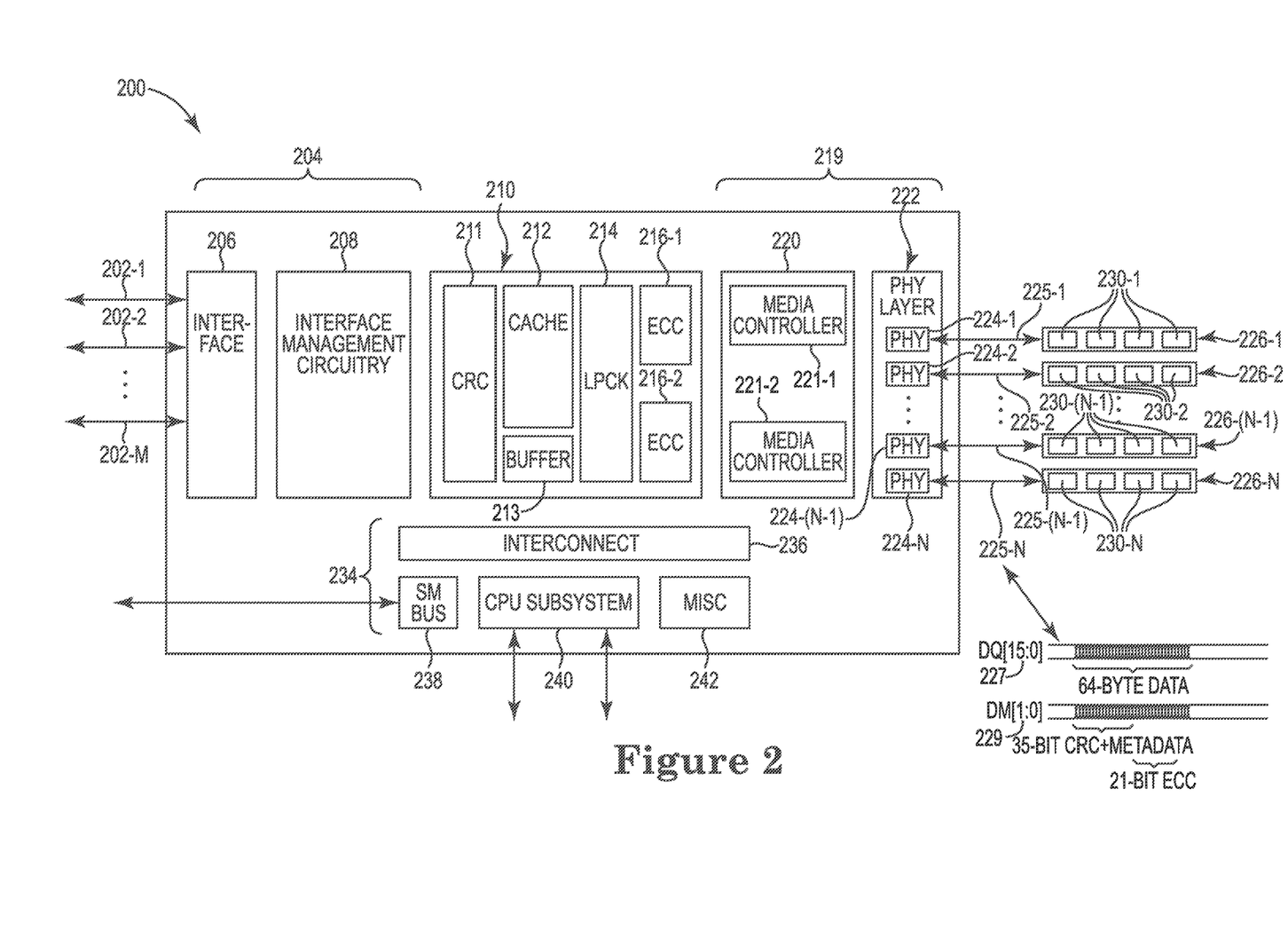
FIG. 2 is a functional block diagram of a memory controller having a first configuration in accordance with a number of embodiments of the present disclosure.

FIG. 2 is a functional block diagram of a memory controller 200 having a first configuration in accordance with a number of embodiments of the present disclosure. As shown in FIG. 2, a front end portion 204 can include an interface 206, which includes multiple I/O lanes 202-1, 202-2, . . . , 202-M, as well as interface management circuitry 208 to manage the interface 206. An example of the interface 206 is a peripheral component interconnect express (PCIe) 5.0 interface. In some embodiments, the memory controller 200 can receive access requests involving at least one of the cache memory 212 and the memory devices 226-1, 226-2, . . . , 226-(N-1), 226-N via the interface 206 according to a CXL protocol. The interface 206 can receive data from a host (e.g., the host 103 shown in FIG. 1) through the of I/O lanes 202. The interface management circuitry 208 may use CXL protocols to manage the interface 206 and may be referred to as CXL interface management circuitry 208. The CXL interface management circuitry 208 can be coupled to a host via the PCIe interface 206.

Data management circuitry 210 can be coupled to the interface management circuitry 208. The data management circuitry 210 can be configured to cause performance of a memory operation. The data management circuitry 210 can include at least one of error detection circuitry 211 (e.g., "CRC circuitry") and error correction circuitry 216. The error detection circuitry 211 can be configured to perform error detection operations on data. For example, the error detection circuitry 211 can be configured to generate a check value resulting from an algebraic calculation on data received from the interface management circuitry 208 and to transmit the check value to at least one of the cache memory 212, buffer 213, and media control circuitry 220. The check value can be referred to as CRC data or error detection data.

For some approaches to LPDDRx memory, the check value would be stored with the data (user data) in the memory device 226 in blocks within a same DRAM row as the user data. This reduces the overall capacity of the memory device 226 to store user data. For LPDDRx memory, such an approach leads to read amplification, where for a host read, the requested data is read from the memory device 226 and the corresponding check value is also read from the memory device. The data can be accessed in a 32 byte granularity and the CRC data can be accessed as 16 bytes, causing a read amplification factor of 1.5. However, according to at least one embodiment of the present disclosure, the LPDDRx memory is modified such that the DRAM row is extended to account for the CRC data, such that a host read in a 32 byte granularity yields the requested read data and the corresponding CRC data without requiring an additional read, thereby yielding a read amplification factor of 1 (e.g., zero amplification).

In at least one embodiment, the error detection circuitry is configured to perform an error detection operation on data received from the interface management circuitry prior to the data being cached and/or operated on by the error correction circuitry 216. Another example of an error detection operation is to generate a check value resulting from an algebraic calculation on data received from the media control circuitry and a comparison of that check value with a check value received from the media control circuitry 220 to determine whether the data includes an error (e.g., if the two check values are not equal).

The data management circuitry 210 can include a cache memory 212 to store data, error detection information, error correction information, and/or metadata associated with performance of the memory operation. An example of the cache memory 212 is a thirty two (32) way set-associative cache memory including multiple cache lines. The cache line size can be equal to or greater than the memory controller 200 access granularity (e.g., 64 bytes for a CXL protocol). For example, each cache line can include 256 bytes of data. In another example, each cache line can include 512 bytes of data. Read and write requests of CXL memory systems can be 64 bytes in size. Therefore, data entries in the cache memory 212 can have 64 bytes of data. Each cache line can comprise 256 bytes. Therefore, multiple 64 byte requests can be stored in each cache line. In response to a request from the host, the memory controller 200 can write 256 bytes of data to a memory device 226, 228. In some embodiments, the 256 bytes of data can be written in 64 byte chunks. Use of the cache memory 212 to store data associated with a read operation or a write operation can increase a speed and/or efficiency of accessing the data because the cache memory 212 can prefetch the data and store the data in multiple 64 byte blocks in the case of a cache miss. Instead of searching a separate memory device in the event of a cache miss, the data can be read from the cache memory 212. Less time and energy may be used accessing the prefetched data than would be used if the memory system has to search for the data before accessing the data.

The data management circuitry 210 can include a buffer 213 to store data, error detection information, error correction information, and/or metadata subject to an operation thereon by another component of the data management circuitry 210 (e.g., the error detection circuitry 211, the error correction circuitry 216, and the low-power chip kill circuitry 214). The buffer 213 can allow for the temporary storage of information, for example, while another component of the data management circuitry 210 is busy. In some embodiments, the cache memory 212 can be used to temporarily store data and the buffer 213 can be used to temporarily store other information associated with the data, such as error detection information, error correction information, and/or metadata.

The data management circuitry can include low-power chip kill (LPCK) circuitry 214 coupled between the error detection circuitry 211 and the error correction circuitry 216. The LPCK circuitry 214 can be configured to perform chip kill operations on the data. The term "chip kill" generally refers to a form of error correction that protects memory systems (e.g., the memory system 101 shown in FIG. 1) from any single memory device 226 (chip) failure as well as multi-bit error from any portion of a single memory chip. The LPCK circuitry 214 can increase the stability of the data and correct errors in the data. The LPCK circuitry 214 can implement the desired LPCK protection collectively across subsets of the memory devices 226 (e.g., LPCK can be provided for a first subset of the memory devices 226-1, 226-2 and separately for a second subset of the memory devices 226-(N-1), 226-N) or across all of the memory devices 226.

An example chip kill implementation for a memory controller 200 including an eleven channel 225 bus having a width of 176 bits coupled to eleven memory devices 226 can include writing data to eight of the eleven memory devices 226 and parity data to three of the eleven memory devices 226. Four codewords can be written, each composed of eleven four-bit symbols, with each symbol belonging to a different memory device 226. A first codeword can comprise the first four-bit symbol of each memory device 226, a second codeword can comprise the second four-bit symbol of each memory device 226, a third codeword can comprise the third four-bit symbol of each memory device 226, and a fourth codeword can comprise the fourth four-bit symbol of each memory device 226.

Figure 4:
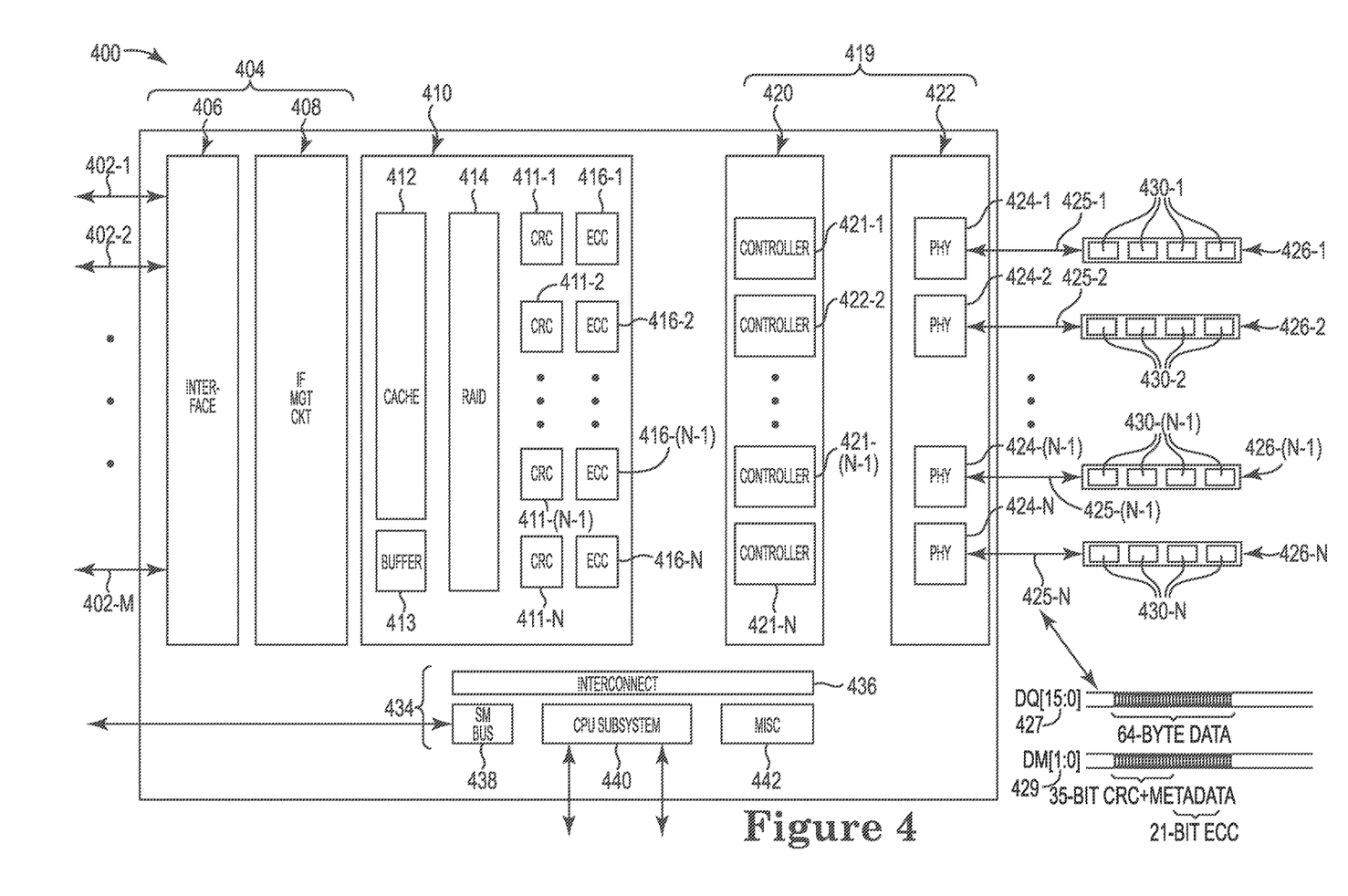
FIG. 4 is a functional block diagram of a memory controller having a third configuration in accordance with a number of embodiments of the present disclosure.
Figure 5:
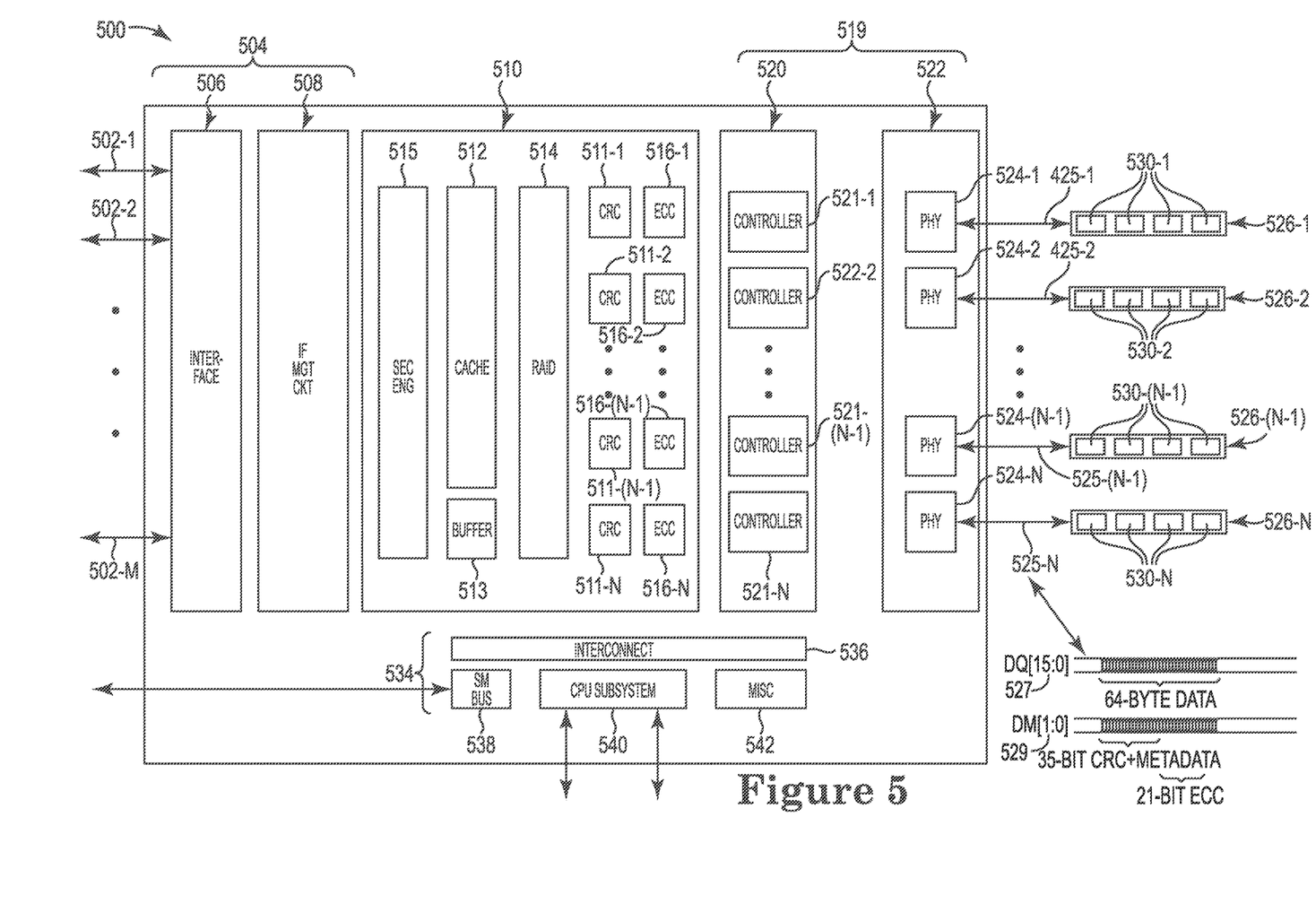
FIG. 5 is a functional block diagram of a memory controller having a fourth configuration in accordance with a number of embodiments of the present disclosure.

The three parity symbols can allow the LPCK circuitry 214 to correct up to one symbol error in each codeword and to detect up to two symbol errors. If instead of adding three parity symbols, only two parity symbols are added, the LPCK circuitry 214 can correct up to one symbol error but only detect one symbol error. In some embodiments, the data symbols and the parity symbols can be written or read concurrently from the memory devices 226. If every bit symbol in a die fails, only the bit symbols from that memory device 226 in the codeword will fail. This allows memory contents to be reconstructed despite the complete failure of one memory device 226. LPCK is considered to be "on-the-fly correction" because the data is corrected without impacting performance by performing a repair operation. In contrast, a redundant array of independent disks (RAID), described in more detail with respect to FIGS. 4-5, is considered to be "check-and-recover correction" because a repair process is initiated to recover data subject to an error. The LPCK circuitry 214 can include combinational logic that uses a feedforward process.

As shown in FIG. 2, the data management circuitry 210 can include error correction circuitry 216-1, 216-2 configured to perform error correction operations on the data (e.g., ECC encode the data and/or ECC decode the data). The error correction circuitry 216 can be coupled to the error detection circuitry 211 for embodiments (not specifically illustrated) that do not include the cache 212, buffer 213, or LPCK circuitry 214. Otherwise, the error correction circuitry 216 can be coupled to any of the cache 212, buffer 213, or LPCK circuitry 214 (as illustrated in FIG. 2). Although two error correction circuits 216 are illustrated, embodiments are not so limited. Embodiments can include only one error correction circuit 216 or more than two error correction circuits 216 in the data management circuitry 210. In at least one embodiment, the memory controller 200 can include an equal quantity of error correction circuits 216-1, 216-2 as media controllers 221-1, 221-2. In at least one embodiment, the data can be protected by the error detection circuitry 211, the LPCK circuitry 214, and the error correction circuitry 216 before being written to the memory devices 226.

As shown in FIG. 2, the memory controller 200 can include a back end portion 219 including a media control circuitry 220 coupled to the data management circuitry 210. The media control circuitry 220 can include media controllers 221-1, 221-2. The back end portion 219 can include a physical (PHY) layer 222 having PHY memory interfaces 224-1, 224-2, . . . , 224-(N-1), 224-N. Each physical interface 224 is configured to be coupled to a respective memory device 226.

The PHY layer 222 can be an LPDDRx memory interface. Each of the PHY memory interfaces 224 can include respective data pins 227 and DMI pins 229. For example, each PHY memory interface 224 can include sixteen data pins 227 "[15:0]" and two DMI pins 229 "[1:0]". The media control circuitry 220 can be configured to exchange data with a respective memory device 226 via the data pins 227. The media control circuitry 220 can be configured to exchange error correction information, error detection information, and or metadata via the DMI pins 229 as opposed to exchanging such information via the data pins 227. The DMI pins 229 can serve multiple functions, such as data mask, data bus inversion, and parity for read operations by setting a mode register. The DMI bus uses a bidirectional signal. In some instances, each transferred byte of data has a corresponding signal sent via the DMI pins 229 for selection of the data. In at least one embodiment, the data can be exchanged contemporaneously with the error correction information and/or the error detection information. For example, 64 bytes of data can be exchanged (transmitted or received) via the data pins 227 while 35 bits of error detection information (and metadata) and 21 bits of error correction information are exchanged via the DMI pins 229. Such embodiments reduce what would otherwise be overhead on the DQ bus for transferring error correction information, error detection information, and/or metadata.

The back end portion 219 can couple the PHY layer portion 222 to memory banks 230-1, 230-2, . . . , 230-(N-1), 230-N of memory devices 226-1, 226-2, . . . , 226-(N-1), 226-N. The memory devices 226 each include at least one array of memory cells. In some embodiments, the memory devices 226 can be different types of memory. The media control circuitry 220 can be configured to control at least two different types of memory. For example, the memory devices 226-1, 226-2 can be LPDDRx memory operated according to a first protocol and the memory devices 226-(N-1), 226-N can be LPDDRx memory operated according to a second protocol different from the first protocol. In such an example, the first media controller 221-1 can be configured to control a first subset of the memory devices 226-1, 226-2 according to the first protocol and the second media controller 221-2 can be configured to control a second subset of the memory devices 226-(N-1), 226-N according to the second protocol. In a specific example, the memory devices 226-1, 226-2 may have on board error correction circuitry.

In some embodiments including different subsets of the memory devices 226 operated according to different protocols, the data management circuitry 210 can selectively enable the error correction circuitry 216 based on the type of memory device 226 being operated. For example, the data management circuitry can disable the error correction circuitry 216-1 for the first subset of memory devices 226-1, 226-2 that have their own error correction circuitry and enable the error correction circuitry 216-2 for the second subset of memory devices 226-(N-1), 226-N that do not have on board error correction circuitry. Such embodiments advantageously allow the memory controller 200 to be designed and fabricated generically for a wider range of memory 226 to be controlled and allow the memory controller 200 to be able to contemporaneously control different types of memory operated according to different protocols.

In some embodiments including different subsets of the memory devices 226 being operated according to different protocols, the memory controller 200 can be configured to disable at least one low-power feature with respect to the first subset of memory devices 226-1, 226-2 and to enable the at least one low-power feature with respect to the second subset of memory devices 226-(N-1), 226-N. Examples of such low-power features include a DVFSC of the memory devices 226 and a SCRC of the memory devices 226. The SCRC can reduce the sub-threshold current, which is useful particularly for memory used in mobile applications. The DVFSC, when enabled, (e.g., by mode registers) allows low-power DRAM to operate internal circuitry from either a high or low voltage rail, depending on the operating frequency. The memory device 226 can internally switch some internal circuits from one rail to the other. However, some memory operations may take longer to completed when the DVFSC is enabled. In some embodiments, only those low-power features that are not supported by the CXL protocol are disabled.

Although not specifically illustrated, for some embodiments including LPCK circuitry 214, the media controller circuitry 220 can include a single media controller 221. When implementing chip kill, the channels 225-1, 225-2, . . . , 225-(N-1), 225-N can be driven concurrently to write data to the memory devices 226. However, in some embodiments, instead of using a single media controller 221, multiple media controllers 221-1, 221-2 can be used to drive the channels 225 in the LPCK architecture. When multiple media controllers 221 are used to drive the channels 225 concurrently, the media controllers 221 are utilized substantially contemporaneously. In at least one embodiment, each of the media controllers 221 can receive a same command and address and drive the channels 225 substantially contemporaneously. By using the same command and address, each of the media controllers 221 can utilize the channels 225 to perform the same memory operation on the same memory cells.

As used herein, the term "substantially" means that the characteristic need not be absolute, but is close enough so as to achieve the advantages of the characteristic. For example, "substantially contemporaneously" is not limited to operations that are performed absolutely contemporaneously and can include timings that are intended to be contemporaneous but due to manufacturing limitations may not be precisely contemporaneously. For example, due to read/write delays that may be exhibited by various interfaces (e.g., LPDDR5 vs. PCIe), media controllers that are utilized "substantially contemporaneously" may not start or finish at exactly the same time. For example, the memory controllers can be utilized such that they are writing data to the memory devices at the same time regardless of whether one of the media controllers commences or terminates prior to the other.

The memory controller 200 can include a management unit 234 configured to initialize, configure, and/or monitor characteristics of the memory controller 200. In some embodiments, the management unit 234 includes a system management (SM) bus 238. The SM bus 238 can manage out-of-band data and/or commands. The SM bus 238 can be part of a serial presence detect. In some embodiments, the SM bus 238 can be a single-ended simple two-wire bus for the purpose of lightweight communication. The management unit 234 can include a CPU subsystem 240, which can function as a controller for the management unit to execute instructions associated with initializing, configuring, and/or monitoring the characteristics of the memory controller 200. The management unit 234 can include miscellaneous circuitry 242, such as local memory to store codes and/or data associated with managing and/or monitoring the characteristics of the memory controller 200. An endpoint of the management unit 234 can be exposed to the host system (e.g., the host 103 shown in FIG. 1) to manage data. In some embodiments, the characteristics monitored by the management unit 234 can include a voltage supplied to the memory controller 200 and/or a temperature measured by an external sensor. The management unit 234 can include an interconnect 236, such as an advanced high-performance bus (AHB) to couple different components of the management unit 234.

The management unit 234 can include circuitry to manage in-band data (e.g., data that is transferred through the main transmission medium within a network, such as a local area network (LAN)). In some embodiments, the CPU subsystem 240 can be a controller that meets the Joint Test Action Group (JTAG) standard and operate according to an Inter-Integrate Circuit ($I^2C$ or $I^3C$) protocol, and auxiliary I/O circuitry. JTAG generally refers to an industry standard for verifying designs and testing printed circuity boards after manufacture. $I^2C$ generally refers to a serial protocol for a two-wire interface to connect low-speed devices like microcontrollers, I/O interfaces, and other similar peripherals in embedded systems. In some embodiments, the auxiliary I/O circuitry can couple the management unit 234 to the memory controller 200. Further, firmware for operating the management unit can be stored in the miscellaneous circuitry 242. In some embodiments, the miscellaneous circuitry 242 can be a flash memory such as flash NOR memory or other persistent flash memory device.

Figure 3:
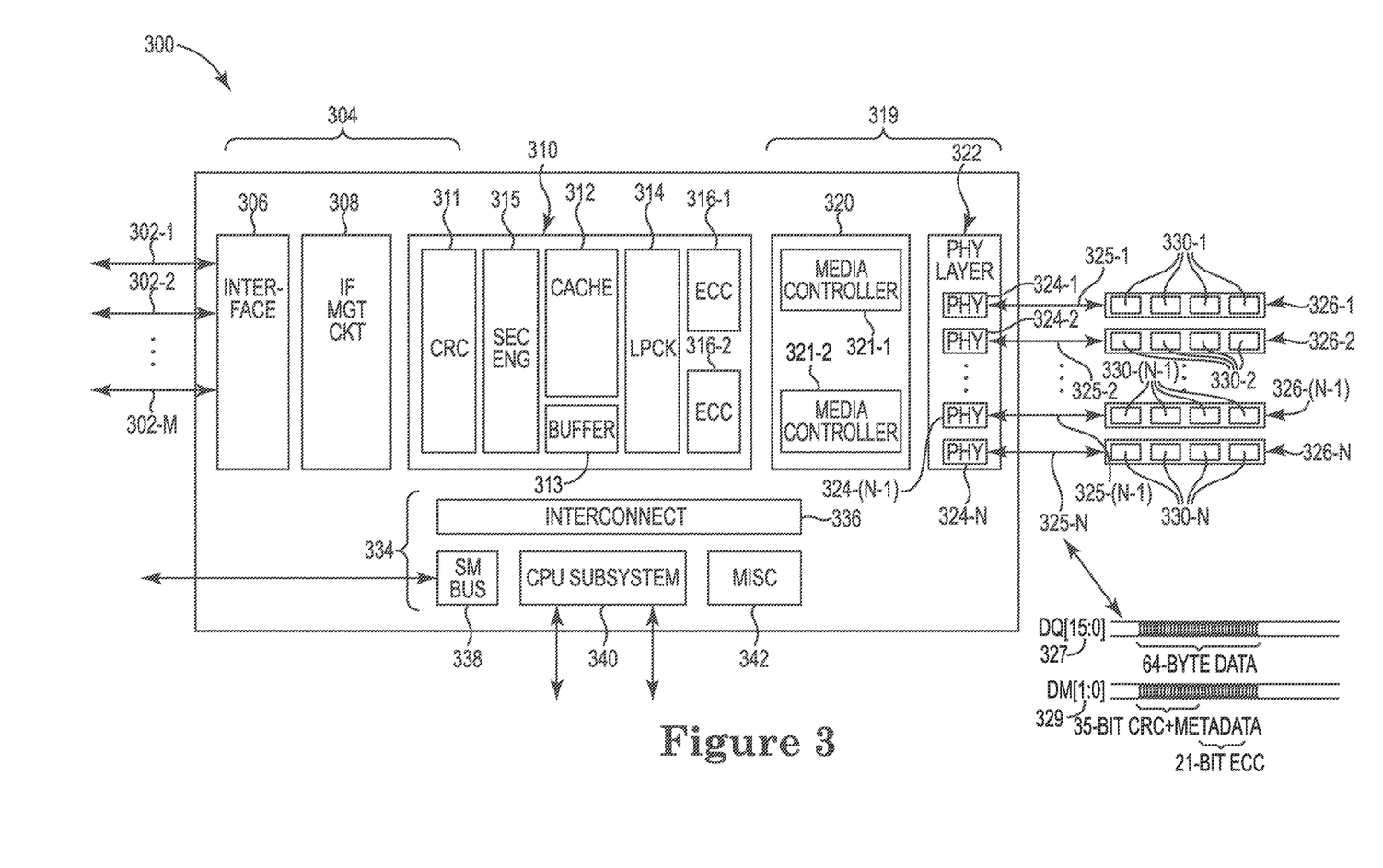
FIG. 3 is a functional block diagram of a memory controller having a second configuration in accordance with a number of embodiments of the present disclosure.

FIG. 3 is a functional block diagram of a memory controller 300 having a second configuration in accordance with a number of embodiments of the present disclosure. The memory controller 300 can include a front end portion 304, data management circuitry 310, and a back end portion 319. The front end portion 304 can include an interface 306, with multiple I/O lanes 302-1, 302-2, . . . , 302-M, as well as interface management circuitry 308 to manage the interface 306. The data management circuitry 310 can include the cache memory 312 and the buffer 313 coupled between the error detection circuitry 311 and the LPCK circuitry 314 and/or the error correction circuitry 316-1, 316-2. The back end portion 319 can include media control circuitry 320 and a PHY layer 322. The media control circuitry 320 can include media controllers 321-1, 321-2. The PHY layer 322 can include PHY memory interfaces 324-1, 324-2, . . . , 324-(N-1), 324-N configured to be coupled to memory banks 230-1, 230-2, . . . , 230-(N-1), 230-N of memory devices 326-1, 326-2, . . . , 326-(N-1), 326-N via channels 325-1, 325-2, . . . , 325-(N-1), 325-N. Each of the PHY memory interfaces 324 can include respective data pins 327 and DMI pins 329. The memory controller 300 can include a management unit 334 including an interconnect 336, an SM bus 338, a CPU subsystem 340, and miscellaneous circuitry 342.

FIG. 3 is analogous to FIG. 2, except that it includes additional circuitry in the form of a security engine 315 in the data management circuitry 310. The security engine 315 can also be referred to as encryption circuitry 315. The encryption circuitry 315 can be coupled between the error detection circuitry 311 and the LPCK circuitry 314. The encryption circuitry 315 can be configured to encrypt data before storing the data in the memory devices 326 or the cache memory 312 and/or decrypt data after reading the encrypted data from the memory devices 326 or the cache memory 312. An example of the encryption circuitry 315 is advanced encryption standard (AES) circuitry.

FIG. 4 is a functional block diagram of a memory controller 400 having a third configuration in accordance with a number of embodiments of the present disclosure. The memory controller 400 can include a front end portion 404, data management circuitry 410, and a back end portion 419. The front end portion 404 can include an interface 406, with multiple I/O lanes 402-1, 402-2, . . . , 402-M, as well as interface management circuitry 408 to manage the interface 406. In contrast to the memory controllers of FIGS. 2-3, the data management circuitry 410 can include the cache memory 412 and the buffer 413 coupled between the interface management circuitry 408 and the error detection circuitry 411 and/or the error correction circuitry 416. More specifically, the cache memory 412 and the buffer 413 can be coupled between the interface management circuitry 408 and RAID circuitry 414. In FIG. 4, the data management circuitry 410 includes RAID circuitry 414 in lieu of LPCK circuitry. In contrast to FIGS. 2-3 the data management circuitry 410 can include a quantity of error detection circuits 411-1, 411-2, . . . , 411-(N-1), 411-N and a quantity of error correction circuits 416-1, 416-2, . . . , 416-(N-1), 416-N equal to the quantity of PHY memory interfaces 424-1, 424-2, . . . , 424-(N-1), 424-N. In such embodiments, there is a 1:1:1 correlation between the error correction circuits 416, the error detection circuits 411, and the memory devices 426.

As described with respect to FIG. 2, in some embodiments, the memory controller 400 can be used to operate different subsets of the memory devices 426 according to different protocols. The data management circuitry 410 can selectively enable the error correction circuitry 416 based on the type of memory device 426 being operated. For example, the data management circuitry 410 can disable the error correction circuitry 416-1, 416-2 for the first subset of memory devices 426-1, 426-2 that have their own error correction circuitry and enable the error correction circuitry 416-(N-1), 416-N for the second subset of memory devices 426-(N-1), 426-N that do not have on board error correction circuitry.

The back end portion 419 can include media control circuitry 420 and a PHY layer 422. The media control circuitry 420 can include media controllers 421-1, 421-2, . . . , 421-(N-1), 421-N. The PHY layer 422 can include PHY memory interfaces 424 configured to be coupled to memory banks 430-1, 430-2, . . . , 430-(N-1), 430-N of memory devices 426-1, 426-2, . . . , 426-(N-1), 426-N via channels 425-1, 425-2, . . . , 425-(N-1), 425-N. In contrast to the memory controllers of FIGS. 2-3, the media control circuitry 420 can include a quantity of media controllers 421 equal to the quantity of PHY memory interfaces 424. Each of the PHY memory interfaces 424 can include respective data pins 427 and DMI pins 429. The memory controller 400 can include a management unit 434 including an interconnect 436, an SM bus 438, a CPU subsystem 440, and miscellaneous circuitry 442.

With respect to solid state memory, RAID refers to distributed data storage across multiple banks 430 of a physical memory device 426, where the distribution serves to achieve one or more of reliability, availability, performance, and capacity. The RAID circuitry 414 can provide one or more of data mirroring, data parity, striping, and combinations thereof depending on the particular implementation. The RAID circuitry 414 can operate on data in conjunction with the error detection circuitry 411 to provide check-and-recover correction, whereas LPCK can provide on-the-fly correction. More specifically, the error detection circuitry 411 can detect an error in data and the RAID circuitry 414 can recover correct data in response. In at least one embodiment, the check-and-recover correction provided by the error detection circuitry 411 and the RAID circuitry 414 is supplemental to the error correction provided by the error correction circuitry 416. For example, if data read from the memory devices 426 has an error correctable by the error correction circuitry 416, it can do so without further data recovery by the RAID circuitry 414. However, if an error persists that is not correctable by the error correction circuitry 416, then the data may be recoverable by the RAID circuitry 414. As another example, an error may escape detection by the error correction circuitry 416, but be detected by the error detection circuitry 411. In such an example, the underlying data may be recoverable by the RAID circuitry 414.

In some embodiments, the RAID circuitry 414 and/or the error detection circuitry 411 (independently or collectively) can be a finite state machine configured to manage a check and recovery algorithm during read operations from the memory devices 426. The RAID circuitry 414 can be configured to perform read-modify-write during write operations to the memory devices 426 (e.g., in order to write the data according to the desired RAID algorithm). In at least one embodiment, the error detection circuits 411-1, 411-2, . . . , 411-(N-1), 411-N can operate independently of each other during read operations in which they function to perform error detection on data specific to the memory device 426-1, 426-2, . . . , 426-(N-1), 426-N with which they are coupled via channels 425-1, 425-2, . . . , 425-(N-1), 425-N. The error detection circuits 411 and the RAID circuitry 414 can operate collectively when performing management of data for the desired RAID algorithm (e.g., stripe). In the event of an error that requires RAID-level correction, the RAID circuitry 414 can be activated and operate on the data, potentially with additional accesses of the memory devices 426, to make the necessary corrections. In contrast, the LPCK circuitry described with respect to FIGS. 2-3, when in operation, does not have such an impact on performance.

In some embodiments, the RAID circuitry 414 can implement the desired RAID algorithm individually for each memory device 426. For example, data can be striped across the banks 430 of an individual memory device 426 rather than across multiple memory devices 426. In some embodiments, the RAID circuitry 414 can stripe data across multiple channels 425 to multiple memory devices 426. In such embodiments, the RAID circuitry 414 can drive multiple channels 425 substantially contemporaneously. Each media controller 421 can execute commands independently of the other media controllers 421. This RAID architecture can provide more flexibility to the memory system in regard to how much data is written to a memory device 426 and when the data is written to a memory device 46 in comparison to the LPCK architecture.

For some approaches to LPDDRx memory including RAID circuitry 414 and error detection circuitry 411, the check values and parity data would be stored with the data (user data) in the memory device 426 in blocks within a same DRAM row as the user data. This reduces the overall capacity of the memory device 426 to store user data. For LPDDRx memory, such an approach leads to write amplification, where for one host write operation causes three memory device 426 read operations (one for the user data to be updated, one for the corresponding CRC data, and one for the corresponding parity data) and three memory device 426 write operations (one for the updated user data, one for the updated CRC data, and one for the updated parity data) causing a write amplification factor of 6. However, according to at least one embodiment of the present disclosure, the LPDDRx memory is modified such that the DRAM row is extended to account for the CRC data. Therefore, a host write operation causes two memory device 426 read operations (one for the user data to be updated and the corresponding CRC data and one for the parity data) and two memory device write operations (one for the updated user data and corresponding CRC data and one for the updated parity data). This reduces the write amplification factor to 4.

FIG. 5 is a functional block diagram of a memory controller 500 having a fourth configuration in accordance with a number of embodiments of the present disclosure. The memory controller 500 can include a front end portion 504, data management circuitry 510, and a back end portion 519. The front end portion 504 can include an interface 506, with multiple I/O lanes 502-1, 502-2, . . . , 502-M, as well as interface management circuitry 508 to manage the interface 506.

FIG. 5 is analogous to FIG. 4, except that it includes additional circuitry in the form of a security engine 515 in the data management circuitry 510. The security engine 515 is analogous to the security engine 315 described with respect to FIG. 3, except that it is coupled between the interface management circuitry 508 and the RAID circuitry 514 instead of being coupled between the error detection circuitry 311 and the LPCK circuitry 314. More specifically, the security engine 515 can be coupled between the interface management circuitry 508 and the cache memory 512 and the buffer memory 513. The security engine (e.g., encryption circuitry 515) is configured to encrypt data before it is operated on by any of the RAID circuitry 514, error detection circuitry 511, and/or error correction circuitry 516 and before it is stored in any of the cache memory 512, buffer memory 513, and/or memory devices 526. The security engine 515 can be configured to decrypt encrypted data after it is read from the memory devices 526 and after any operations performed thereon by the error correction circuitry 516, error detection circuitry 511, and/or RAID circuitry 514.

The data management circuitry 510 can include a quantity of error detection circuits 511-1, 511-2, ..., 511-(N-1), 511-N and a quantity of error correction circuits 516-1, 516-2, ..., 516-(N-1), 516-N equal to the quantity of PHY memory interfaces 524-1, 524-2, ..., 524-(N-1), 524-N. In such embodiments, there is a 1:1:1 correlation between the error correction circuits 516, the error detection circuits 511, and the memory devices 526.

The back end portion 519 can include media control circuitry 520 and a PHY layer 522. The media control circuitry 520 can include media controllers 521-1, 521-2, ..., 521-(N-1), 521-N. The PHY layer 522 can include PHY memory interfaces 524 configured to be coupled to memory banks 530-1, 530-2, ..., 530-(N-1), 530-N of memory devices 526-1, 526-2, ..., 526-(N-1), 526-N via channels 525-1, 525-2, ..., 525-(N-1), 525-N. Each of the PHY memory interfaces 524 can include respective data pins 527 and DMI pins 529. The memory controller 500 can include a management unit 534 including an interconnect 536, an SM bus 538, a CPU subsystem 540, and miscellaneous circuitry 542.

Figure 6:
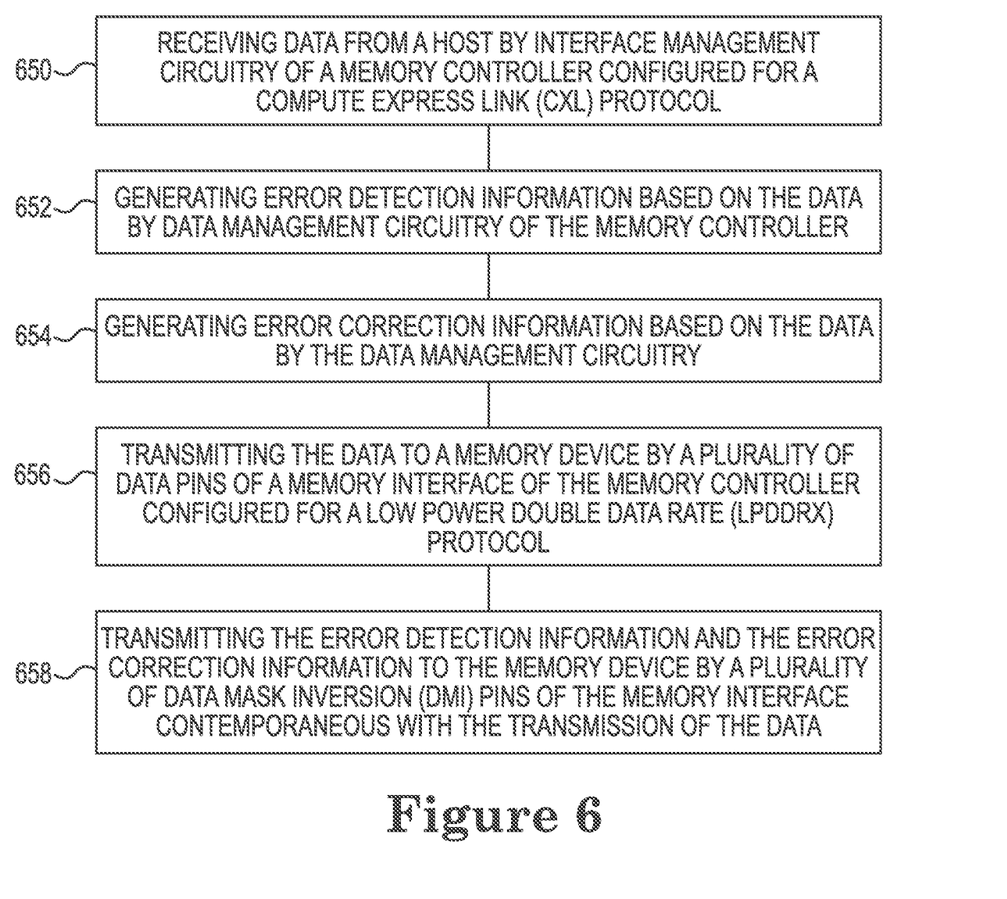
FIG. 6 is a flow diagram of a method for writing data and error information to a memory device in accordance with a number of embodiments of the present disclosure.

FIG. 6 is a flow diagram of a method for writing data and error information to a memory device in accordance with a number of embodiments of the present disclosure. The methods described herein (e.g., with respect to FIGS. 6-7) can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 650, the method can include receiving data from a host by CXL interface management circuitry of a memory controller. At block 652, the method can include generating error detection information based on the data by data management circuitry of the memory controller. At block 654, the method can include generating error correction information based on the data by the data management circuitry. In some embodiments, the error detection information can be generated before the error correction information.

In some embodiments, the data can be encrypted by the data management circuitry after generating the error detection information and before generating the error correction information. In some embodiments, an LPCK operation can be performed by the data management circuitry after encrypting the data and before generating the error correction information. The data can be cached or buffered by the data management circuitry after encrypting the data and before performing the LPCK operation.

In some embodiments, a RAID recovery operation can be performed on the data by the data management circuitry before generating the error detection information. The method can include encrypting the data by the data management circuitry before performing the recovery operation. The method can include caching or buffering the data, by the data management circuitry after encrypting the data and before performing the recovery operation.

At block 656, the method can include transmitting the data to a memory device by data pins of an LPDDRx memory interface of the memory controller. At block 658, the method can include transmitting the error detection information and the error correction information to the memory device by DMI pins of the LPDDRx memory interface contemporaneous with the transmission of the data.

Although not specifically illustrated, the method can include additional elements that may be beneficial, particularly when memory devices operated according to different protocols are managed by the same memory controller. For example, the method can include not error correction coding or error detection coding the data by the memory device. The method can include prohibiting, by firmware, enablement of a DVFSC of the memory device. The method can include prohibiting, by firmware, enablement of an SCRC of the memory device.

Figure 7:
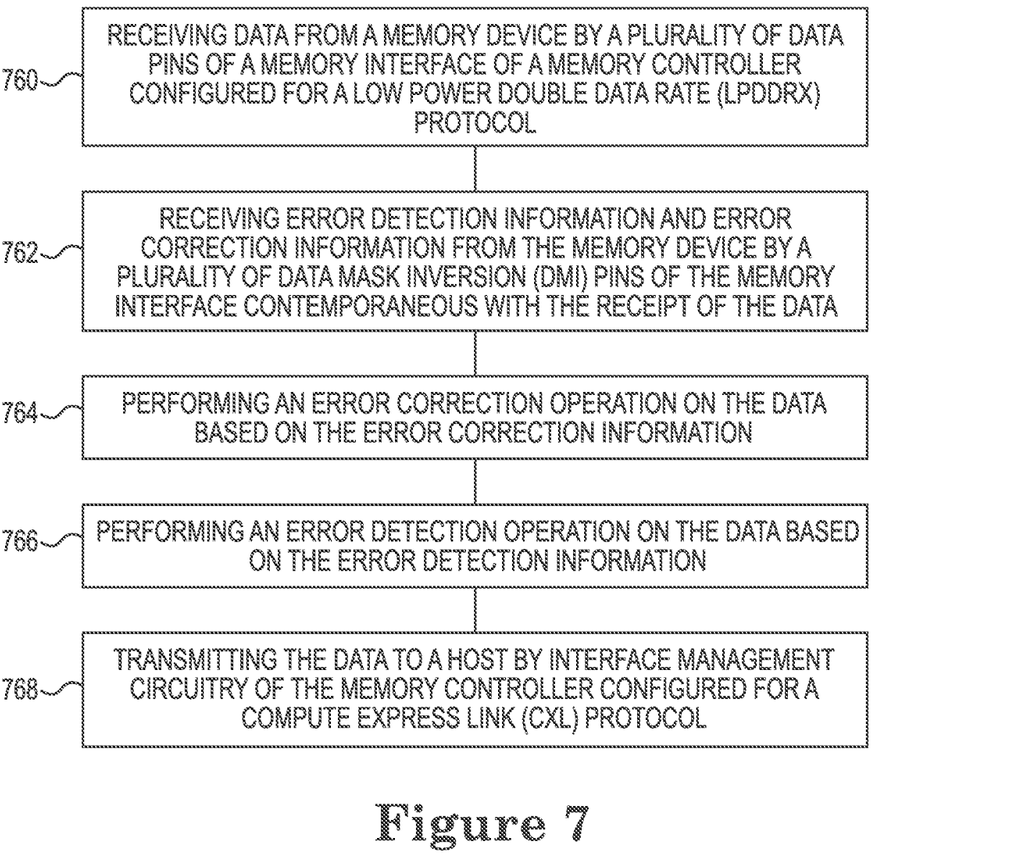
FIG. 7 is a flow diagram of a method for reading data and error information from a memory device in accordance with a number of embodiments of the present disclosure.

FIG. 7 is a flow diagram of a method for reading data and error information from a memory device in accordance with a number of embodiments of the present disclosure. At block 760, the method can include receiving data from a memory device by a plurality of data pins of an LPDDRx memory interface of a memory controller. At block 762, the method can include receiving error detection information and error correction information from the memory device by DMI pins of the LPDDRx memory interface contemporaneous with the receipt of the data. At block 764, the method can include performing an error correction operation on the data based on the error correction information. At block 766, the method can include performing an error detection operation on the data based on the error detection information. The error correction operation can be performed before the error detection operation. At block 768, the method can include transmitting the data to a host by CXL interface management circuitry of the memory controller.

For embodiments in which the data is encrypted, the method can include decrypting the data by the data management circuitry after performing the error correction operation and before performing the error detection operation. The method can include performing low-power chip kill (LPCK) error correction by the data management circuitry after performing the error correction operation and before decrypting the data. The method can include caching or buffering the data, by the data management circuitry after performing the LPCK error correction and before decrypting the data. In at least one embodiment, error correction and/or error detection is not performed by the memory device.

The method can include performing a RAID recovery operation on the data by the data management circuitry after performing the error detection operation. For embodiments in which the data is encrypted, the method can include decrypting the data by the data management circuitry after performing the recovery operation. The method can include caching or buffering the data, by the data management circuitry after performing the recovery operation and before decrypting the data.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving a first signal indicative of data from a host by interface management circuitry of a memory controller configured for a Compute Express Link (CXL) protocol;
   generating error detection information based on the data by data management circuitry of the memory controller;
   generating error correction information based on the data by the data management circuitry;
   transmitting a second signal indicative of the data to a memory device by a plurality of data pins of a memory interface of the memory controller configured for a low-power double data rate (LPDDRx) protocol;
   transmitting a third signal indicative of the error detection information and the error correction information to the memory device by a plurality of data mask inversion (DMI) pins of the memory interface of the memory controller configured for LPDDRx protocol contemporaneous with the transmission of the data; and
   prohibiting, by firmware, enablement of a dynamic voltage frequency scaling core (DVFSC) of the memory device.

2. The method of claim 1, further comprising receiving data without error correction coding or error detection coding from the memory device.

3. The method of claim 1, further comprising prohibiting, by firmware, enablement of a sub-threshold current reduce circuit (SCRC) of the memory device.

4. The method of claim 1, wherein the method includes generating the error detection information before generating the error correction information.

5. The method of claim 4, further comprising encrypting the data by the data management circuitry after generating the error detection information and before generating the error correction information.

6. The method of claim 5, further comprising performing a low-power chip kill (LPCK) operation by the data management circuitry after encrypting the data and before generating the error correction information.

7. The method of claim 6, further comprising caching or buffering the data, by the data management circuitry after encrypting the data and before performing the LPCK operation.

8. The method of claim 4, further comprising performing a redundant array of independent disks (RAID) recovery operation on the data by the data management circuitry before generating the error detection information.

9. The method of claim 8, further comprising encrypting the data by the data management circuitry before performing the recovery operation.

10. The method of claim 9, further comprising caching or buffering the data, by the data management circuitry after encrypting the data and before performing the recovery operation.

11. A method, comprising:
    receiving first signals indicative of data from a memory device by a plurality of data pins of a memory interface of a memory controller configured for a low-power double data rate (LPDDRx) protocol, wherein the data comprises encrypted data;
    receiving second signals indicative of error detection information and error correction information from the memory device by a plurality of data mask inversion (DMI) pins of the memory interface of the memory controller configured for LPDDRx protocol contemporaneous with the receipt of the data;
    performing an error correction operation on the data based on the error correction information;
    decrypting the data after performing the error correction operation;
    performing an error detection operation on the data, after decrypting the data, based on the error detection information; and
    transmitting third signals indicative of the data to a host by interface management circuitry of the memory controller configured for a compute express link (CXL) protocol.

12. The method of claim 11, further comprising not performing error correction or error detection operations on the data by the memory device.

13. The method of claim 11, further comprising performing low-power chip kill (LPCK) error correction after performing the error correction operation and before decrypting the data.

14. The method of claim 13, further comprising caching or buffering the data after performing the LPCK error correction and before decrypting the data.

15. The method of claim 11, further comprising performing a redundant array of independent disks (RAID) recovery operation on the data after performing the error detection operation.

16. The method of claim 15, further comprising decrypting the data after performing the recovery operation.

17. The method of claim 16, further comprising caching or buffering the data after performing the recovery operation and before decrypting the data.

18. A memory controller, comprising:
  interface management circuitry configured for a compute express link (CXL) protocol;
  data management circuitry coupled to the interface management circuitry, wherein the data management circuitry includes:
    error detection circuitry configured to perform error detection operations on data; and
    error correction circuitry coupled to the error detection circuitry and configured to perform error correction operations on the data;
  media control circuitry coupled to the data management circuitry; and
  a memory interface, configured for a low-power double data rate (LPDDRx) protocol, coupled to the media control circuitry, wherein the memory interface includes a plurality of physical memory interfaces, each physical memory interface including a respective plurality of data pins and a respective plurality of data mask inversion (DMI) pins;
  wherein the media control circuitry is configured to:
    exchange first signals indicative of the data via the respective plurality of data pins; and
    exchange second signals indicative of error correction information and error detection information via the respective plurality of DMI pins contemporaneously with the exchange of the data; and
  wherein the data management circuitry is configured to selectively enable the error correction circuitry based on a type of memory being operated.

19. The memory controller of claim 18, wherein the media control circuitry is configured to operate at least two different types of memory.

20. The memory controller of claim 18, wherein the data management circuitry includes low-power chip kill (LPCK) circuitry coupled between the error detection circuitry and the error correction circuitry;
  wherein the LPCK circuitry is configured to perform chip kill operations on the data.

21. The memory controller of claim 20, wherein the data management circuitry includes encryption circuitry coupled between the error detection circuitry and the LPCK circuitry;
  wherein the encryption circuitry is configured to encrypt the data and decrypt encrypted data.

22. The memory controller of claim 21, wherein the data management circuitry includes a cache and a buffer coupled between the error detection circuitry and the LPCK circuitry; and
  wherein the data management circuity is configured to cache the data in the cache and buffer the data in the buffer.

23. The memory controller of claim 18, wherein the data management circuitry includes redundant array of independent disks (RAID) circuitry coupled to the error detection circuitry;
  wherein the RAID circuitry is configured to perform a recovery operation on the data.

24. The memory controller of claim 23, wherein the data management circuitry includes encryption circuitry coupled to the RAID circuity and configured to encrypt the data and decrypt encrypted data.

25. The memory controller of claim 24, wherein the data management circuitry includes a cache and a buffer coupled between the encryption circuitry and the RAID circuitry; and
  wherein the data management circuitry is configured to cache the data in the cache and buffer the data in the buffer.

26. The memory controller of claim 18, wherein the plurality of data pins comprises sixteen pins and the plurality of DMI pins comprises two pins; and
  wherein the media control circuitry is configured to:
    exchange 64 bytes of the data via the respective plurality of data pins; and
    exchange at least 56 bits of error correction information, error detection information, and metadata via the respective plurality of DMI pins contemporaneously with the exchange of the 64 bytes of data.

27. A memory system, comprising:
  a plurality of memory devices each including at least one memory array; and
  a memory controller coupled to the plurality of memory devices, wherein the memory controller includes:
    interface management circuitry configured for a compute express link (CXL) protocol and configured to be coupled to a host via an interface configured for a peripheral component interconnect express (PCIe) protocol;
    data management circuitry coupled to the interface management circuitry, wherein the data management circuitry includes at least one of:
      error detection circuitry configured to perform error detection operations on data; and
      error correction circuitry coupled to the error detection circuitry and configured to perform error correction operations on the data; and
    media control circuitry coupled to the data management circuitry; and
    a respective physical interface with each of the plurality of memory devices, each physical interface including a respective plurality of data pins and a respective plurality of data mask inversion (DMI) pins;
  wherein the media control circuitry is configured to:
    operate a first subset of the plurality of memory devices according to a first protocol and a second subset of the plurality of memory devices according to a second protocol;
    disable at least one low-power feature with respect to the first subset of memory devices;
    enable the at least one low-power feature with respect to the second subset of memory devices;
    exchange first signals indicative of the data with a respective memory device via the respective plurality of data pins; and
    exchange second signals indicative of at least one of error correction information and error detection information with the respective memory device via the respective plurality of DMI pins contemporaneously with the exchange of the data.

28. The memory system of claim 27, wherein the memory controller is configured to:
  enable the error correction circuitry for operations targeting the first subset of memory devices; and
  disable the error correction circuitry for operations targeting the second subset of memory devices.

29. A method, comprising:
- receiving a first signal indicative of data from a host by interface management circuitry of a memory controller configured for a Compute Express Link (CXL) protocol;
- generating error detection information based on the data by data management circuitry of the memory controller;
- generating error correction information based on the data by the data management circuitry;
- transmitting a second signal indicative of the data to a memory device by a plurality of data pins of a memory interface of the memory controller configured for a low-power double data rate (LPDDRx) protocol;
- transmitting a third signal indicative of the error detection information and the error correction information to the memory device by a plurality of data mask inversion (DMI) pins of the memory interface of the memory controller configured for LPDDRx protocol contemporaneous with the transmission of the data; and
- prohibiting, by firmware, enablement of a sub-threshold current reduce circuit (SCRC) of the memory device.

30. The method of claim 29, wherein the method includes generating the error detection information before generating the error correction information.

31. The method of claim 30, further comprising encrypting the data by the data management circuitry after generating the error detection information and before generating the error correction information.

32. The method of claim 31, further comprising performing a low-power chip kill (LPCK) operation by the data management circuitry after encrypting the data and before generating the error correction information; and
- caching or buffering the data, by the data management circuitry after encrypting the data and before performing the LPCK operation.

33. The method of claim 30, further comprising performing a redundant array of independent disks (RAID) recovery operation on the data by the data management circuitry before generating the error detection information.

34. The method of claim 33, further comprising encrypting the data by the data management circuitry before performing the recovery operation; and
- caching or buffering the data, by the data management circuitry after encrypting the data and before performing the recovery operation.

\* \* \* \* \*